(12) United States Patent
Knowles et al.

(10) Patent No.: US 8,260,851 B2
(45) Date of Patent: *Sep. 4, 2012

(54) SYSTEM AND METHOD FOR MAINTAINING ON A HANDHELD ELECTRONIC DEVICE INFORMATION THAT IS SUBSTANTIALLY CURRENT AND IS READILY AVAILABLE TO A USER

(75) Inventors: Michael Knowles, Waterloo (CA); Julian Paas, Mississauga (CA); Frank Tyneski, Kitchener (CA); Jason T. Griffin, Waterloo (CA)

(73) Assignee: Research In Motion Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,949

(22) Filed: Apr. 6, 2011

(65) Prior Publication Data
US 2011/0185005 A1 Jul. 28, 2011

Related U.S. Application Data

(63) Continuation of application No. 12/620,063, filed on Nov. 17, 2009, now Pat. No. 7,945,617, which is a continuation of application No. 10/931,268, filed on Aug. 31, 2004, now Pat. No. 7,650,377.

(60) Provisional application No. 60/575,458, filed on May 28, 2004.

(51) Int. Cl.
*G06F 15/16* (2006.01)
(52) U.S. Cl. ......... 709/203; 709/220; 709/227; 709/228
(58) Field of Classification Search .......... 709/202–203, 709/220–222, 227–228
See application file for complete search history.

(56) References Cited

U.S. PATENT DOCUMENTS

| | | | |
|---|---|---|---|
| 6,029,195 A | 2/2000 | Herz | |
| 6,985,933 B1* | 1/2006 | Singhal et al. | 709/203 |
| 7,945,617 B2* | 5/2011 | Knowles et al. | 709/203 |
| 2002/0065905 A1* | 5/2002 | Kliland et al. | 709/220 |
| 2003/0208622 A1* | 11/2003 | Mosier | 709/220 |
| 2005/0278448 A1* | 12/2005 | Mazor | 709/227 |

OTHER PUBLICATIONS

Knowles et al.; "System and Method for Maintaining on a Handheld Electronic Device Information THA TIS Substantially Current and Is Readily Available to the User"; U.S. Appl. No. 12/620,063, filed Nov. 17, 2009.

* cited by examiner

*Primary Examiner* — Bharat N Barot
(74) *Attorney, Agent, or Firm* — Perry + Currier

(57) ABSTRACT

An improved system and method for managing data on a handheld electronic device includes a server that periodically pushes data to a particular handheld electronic device, with the data being stored on the handheld electronic device by way of a routine running in the background whereby such reception and storage is generally transparent to a user. The data can be any type of data and may be data that is desired by the user or that fits a profile or preference of the user. The profile can, for instance, be predetermined and/or can be customized by the user and/or can reflect a preference of the user. The data pushed to the handheld electronic device can also be related in some fashion to a geographic disposition of the handheld electronic device. Such pushing of data and storage is managed by a routine running in the background of the handheld electronic device. The routine enables current data to be maintained on the handheld electronic device for ready access by a user.

20 Claims, 6 Drawing Sheets

SYSTEM AND METHOD FOR MAINTAINING ON A HANDHELD ELECTRONIC DEVICE INFORMATION THAT IS SUBSTANTIALLY CURRENT AND IS READILY AVAILABLE TO A USER

CROSS-REFERENCE TO RELATED CASES

The present application is a continuation of pending application Ser. No. 12/620,063 filed Nov. 17, 2009, which is a continuation of U.S. application Ser. No. 10/931,268 filed Aug. 31, 2004 (issued U.S. Pat. No. 7,650,334) which in turn claims priority from U.S. provisional app. No. 60/575,458 filed May 28, 2004, the contents of which are incorporated herein by reference.

BACKGROUND OF THE INVENTION

1. Field of the Invention

The invention relates generally to handheld electronic devices and, more particularly, to a system and method of maintaining data on a handheld electronic device and making it easily available to a user.

2. Background of the Invention

Numerous types of handheld devices are known. Examples of such handheld devices include, for instance, personal data assistants (PDAs), handheld computers, two-way pagers, cellular telephones and the like. Such handheld electronic devices are generally intended to be portable, and thus are relatively small. Many handheld electronic devices also feature wireless communication capability, although many such handheld electronic devices are stand-alone devices that are functional without communication with other devices. With advances in technology, handheld electronic devices are being configured to include greater number of features while having relatively smaller form factors.

Wireless communication between a server and a client such as a handheld electronic device can occur in numerous ways. One mode of communication can be referred to as a "pull" wherein the handheld electronic device transmits a signal requesting data, and in response thereto a server transmits the desired data to the handheld electronic device. Another mode of communication can be referred to as a "push" wherein a server transmits data to a client such as a handheld electronic device without an express request from the client. The transmission of data in either of these fashions requires a certain amount of transmission time, and significant quantities of data can require substantial amounts of time to communicate between the server and the client.

For those handheld electronic devices having a wireless communication capability, it would be desirable to provide to a user data that is meaningful to a user or is desired by a user. It further would be desirable to provide such information to a user on a more or less instantaneous basis so that a user does not need to wait in order to obtain the data that is desired by the user. Such data preferably would be readily accessible to the user. Accordingly, it would be desirable to provide a system and method of providing on a handheld electronic device such data in such a readily accessible fashion.

SUMMARY OF THE INVENTION

An improved system and method for managing data on a handheld electronic device includes a server that periodically pushes data to a particular handheld electronic device, with the data being stored on the handheld electronic device by way of a routine running in the background whereby such reception and storage is generally transparent to a user. The data can be any type of data and may be data that is desired by the user or that fits a profile or preference of the user. The profile can, for instance, be predetermined and/or can be customized by the user and/or can reflect a preference of the user. The data pushed to the handheld electronic device can also be related in some fashion to a geographic disposition of the handheld electronic device. Such pushing of data and storage is managed by a routine running in the background of the handheld electronic device. The routine enables current data to be maintained on the handheld electronic device for ready access by a user.

Accordingly, an aspect of the invention is to provide an improved method for managing data on a handheld electronic device, periodically pushing data to the handheld electronic device, and storing the data on the handheld electronic device for ready access by a user.

Another aspect of the invention is to provide an improved method of managing data on a handheld electronic device by pushing to the handheld electronic device data that is meaningful or desirable to the user, such as in a mobile context, and by storing such data on the handheld electronic device.

Another aspect of the invention is to provide an improved method for managing data on a handheld electronic device by maintaining data stored on the handheld electronic device and by making the data readily accessible by a user, such as even if the handheld electronic device is out of communication with a wireless communications network.

Another aspect of the invention is to provide an improved method for managing data on a handheld electronic device by periodically pushing data to the handheld electronic device in response to a predetermined event, such as when the data changes, and by storing the data on the handheld electronic device, so that the handheld electronic device generally has available thereon the most up to date data even if the handheld electronic device is out of communication with a wireless communication network.

Another aspect of the device is to provide a method for managing data on a handheld electronic device wherein the type of data can be predetermined and/or customized by a user and/or is reflective of a preference of the user.

Another aspect of the invention is to provide an improved method of providing on a handheld electronic device data that is related to a geographic disposition of the handheld electronic device.

Another aspect of the invention is to provide an improved method of enabling an association based upon some type of relatedness of the client profile between a plurality of clients of a server or of a plurality of servers that are capable of communication with one another.

Accordingly, an aspect of the invention is to provide an improved method of managing data on a handheld electronic device, with the handheld electronic device including a wireless communication system, a processor apparatus, an input apparatus, and an output apparatus, the wireless communication system being adapted to enable wireless communication between the handheld electronic device and a server. The processor apparatus includes a processor and a memory, the input apparatus having a plurality of input members and being adapted to provide input to the processor apparatus. The output apparatus is adapted to receive output signals from the processor apparatus and to provide output representative of the output signals. The handheld electronic device is identifiable to the server by a unique identifier. The general nature of the method can be stated as including making available to the server a profile associated with the handheld electronic device, forming a first set of data, employing the unique identifier to push from the server to the handheld electronic device a first signal representative at least in part of at least a portion of the first set of data, storing on the handheld electronic device a second set of data derived at least in part from at least a portion of the first signal, and employing at least a portion of the profile to configure at least a portion of at least one of the first set of data and the second set of data to comply at least in part with the profile. The method further includes, responsive to a predetermined event, altering at least a portion of the first set of data to form an updated first set of data, employing the unique identifier to push from the server to the handheld electronic device a second signal representative at least in part of at least a portion of the updated first set of data, storing on the handheld electronic device an updated second set of data derived at least in part from at least a portion of the second signal, and employing at least a portion of the profile to configure at least a portion of at least one of the updated first set of data and the updated second set of data to comply at least in part with at least a portion of the profile.

BRIEF DESCRIPTION OF THE DRAWINGS

A full understanding of the invention can be gained from the following Description of the Preferred Embodiment when read in conjunction with the accompanying drawings in which.

Similar numerals refer to similar parts to the specification.

DESCRIPTION OF THE PREFERRED EMBODIMENT

Figure 1:
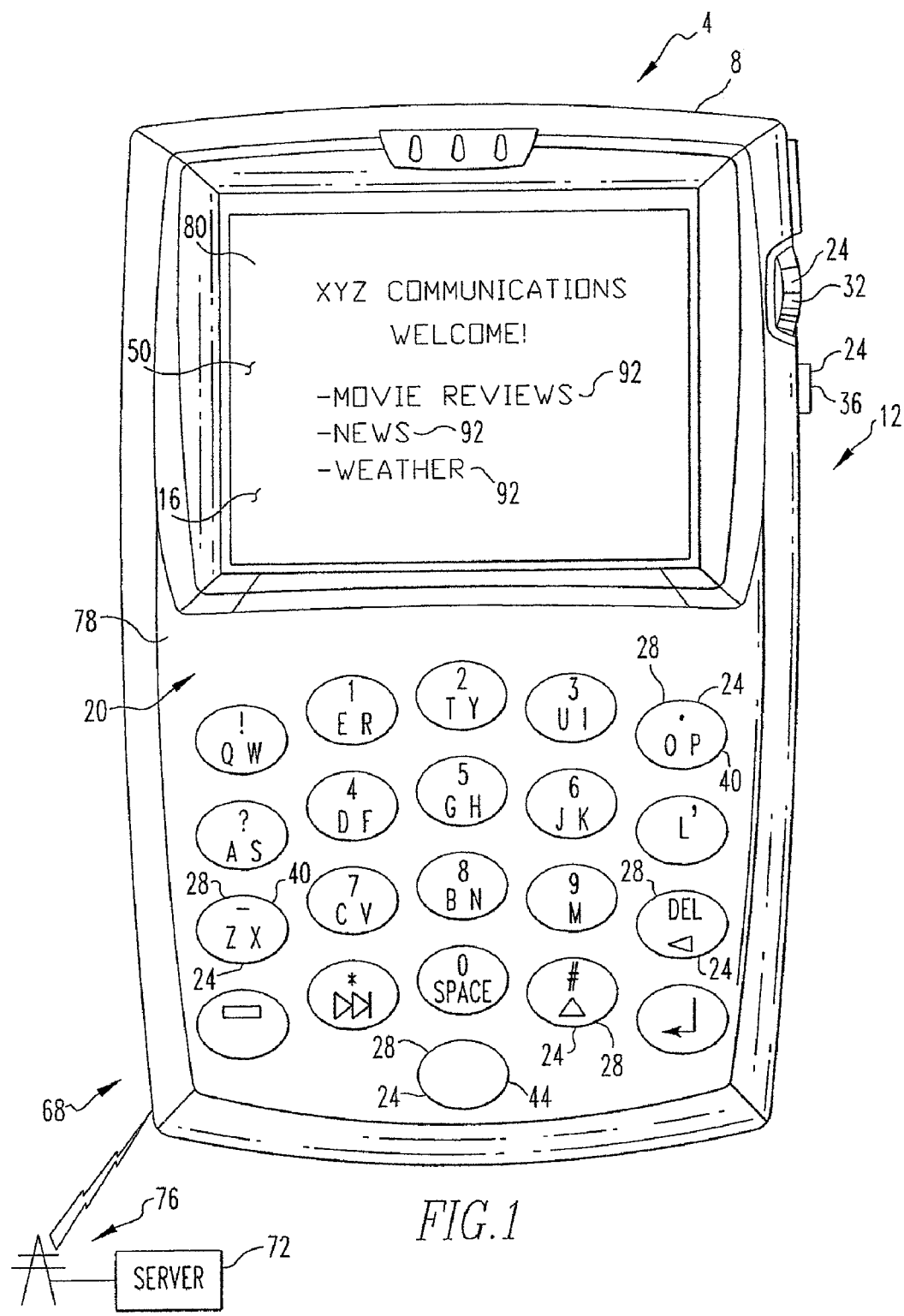
FIG. 1 is a top plan view of an improved handheld electronic device in accordance with the invention and on which the improved method of the invention can be implemented.
Figure 2:
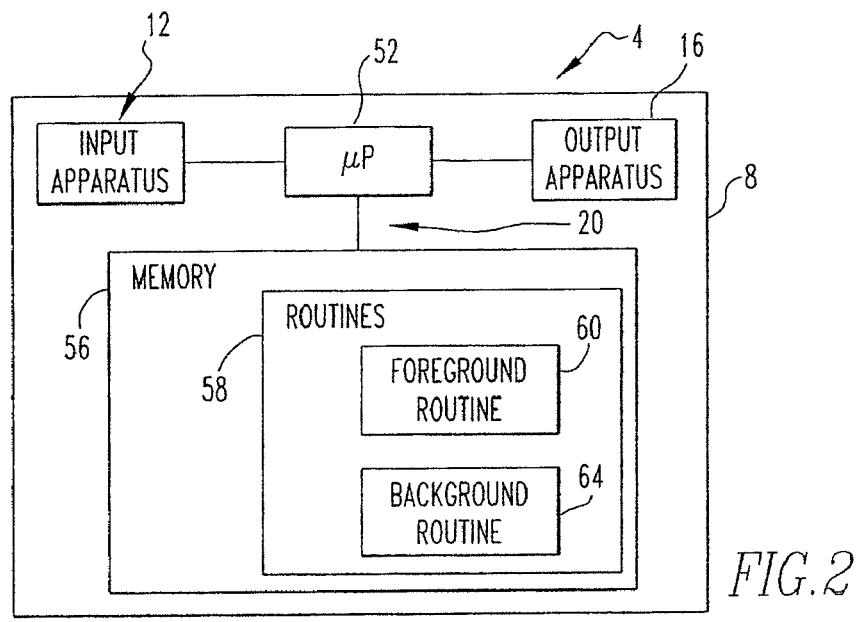
FIG. 2 is a schematic depiction of the improved handheld electronic device of FIG. 1.

An improved handheld electronic device 4 in accordance with the invention is indicated generally in FIG. 1 and is depicted schematically in FIG. 2. The exemplary handheld electronic device 4 includes a housing 8 upon which are disposed an input apparatus 12, an output apparatus 16 and a processor apparatus 20. The input apparatus 12 includes a plurality of input members 24 that can be said to include a plurality of keys 28, a rotatable track wheel 32, and an <ESCAPE> key 36. The keys 28 include a plurality of alphanumeric keys 40 and a special <CONVENIENCE> key 44. The output apparatus 16 includes a display 50. The output apparatus 60 can additionally include, for instance, additional indicators such as lights, and the like, and can additionally include an audible output such as a speaker as well as other output devices.

The processor apparatus 20 includes a processor 52 that can be, for instance, and without limitation, a microprocessor (µP), and it is responsive to inputs from the input apparatus 12 and provides output signals to the output apparatus 16. The processor apparatus 20 further includes a memory 56 that includes a number of routines 58 stored thereon. As employed herein, the expression "a number of" and variations thereof shall refer broadly to any nonzero quantity including a quantity of one. The processor 52 interfaces with the memory 56, and the routines 58 are executable on the processor 52.

The routines 58 include, among other routines, a foreground routine 60 and a background routine 64. As a general matter, the foreground routine 60 is a routine that, when active on the handheld electronic device 4, is apparent to the user. For instance, the foreground routine 60 operates on input received from the input apparatus 12 and provides output to the output apparatus 16. The background routine 64 operates in a fashion that is generally transparent to the user. For instance, the background routine 64 may manage various activities that do not require input of the type that might be provided from the user through the input apparatus 12, and generally do not require that an output be provided of the type that might be provided to the user through the output apparatus 16. It is understood, however, that the background routine 64 may, in some circumstances, receive input and/or provide output to a user without departing from the concept of the invention. As a general matter, however, the operation of the background routine 64 is generally transparent to the user.

As can further be understood from FIG. 1, the handheld electronic device 4 is part of a communications system 68 that includes, in addition to the handheld electronic device 4, a server 72 and a communications network 76. The communications network 76 is represented by the schematically depicted antenna and a connection with the server 72. The handheld electronic device 4 includes a wireless communications system 78 that enables wireless communication between the handheld electronic device 4 and the communications network 76 and, ultimately, the server 72.

Figure 3:
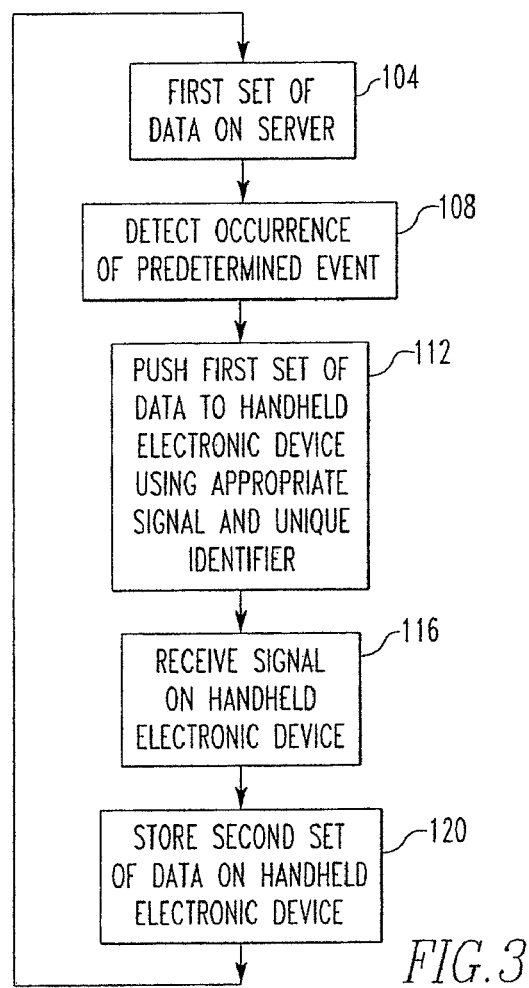
FIG. 3 is an exemplary flowchart of a portion of the improved method of the invention.

As a general matter, an exemplary flow of information on the system 68 between the handheld electronic device 4 and the server 72 is depicted in FIG. 3. A first set of data is created, for example, on the server 72, as at 104. While the data need not necessarily be stored on the server 72, the data is at least identified to or available to the server 72 for communication to the handheld electronic device 4.

Upon a detection of an occurrence of a predetermined event, such as at 108, the first set of data is pushed, as at 112, to the handheld electronic device 4 using an appropriate signal and employing a unique identifier that uniquely identifies the handheld electronic device 4. The signal is representative, at least in part, of at least a portion of the first set of data and is transmitted from the server 72 through the communications network 76 to the wireless communication system 78 of the handheld electronic device 4. The handheld electronic device 4 includes a unique identifier that is known to the server 72 and that uniquely identifies the handheld electronic device 4 to the server 72. As a general matter, the signal can be directed uniquely to the handheld electronic device 4 by providing the unique identifier as a header in the signal, i.e., as a header in the data transmission.

The aforementioned predetermined event can be any of a variety of events that might make it desirable for the first set of data to be transmitted to the handheld electronic device. For instance, the predetermined event might be some type of change in the first set of data. The predetermined event potentially could also or alternatively be a change in some type of predetermined parameter either on the handheld electronic device 4, the server 72 or on another part of the system 68. The aforementioned predetermined events are exemplary only, and it should be apparent that virtually any circumstance can be employed to trigger a push, as at 112, of the first set of data toward the handheld electronic device 4.

The signal sent from the server 72, as at 112, is received, as at 116, on the handheld electronic device 4 by the wireless communication system 78. The wireless communication system 78 can, for instance, recognize that the signal is intended for the operating system on the handheld electronic device 4 and, by way of further example, the operating systems can determine that the signal is intended for the background routine 64. The operating system might then activate the background routine 64 and transfer the signal to it for processing on the processor 52 in the background of the handheld electronic device 4. The background routine 64 then would store, as at 120 the contents of the signal as a second set of data that is stored in the memory 56 of the handheld electronic device 4.

It thus can be seen that the signal received on the handheld electronic device 4 from the server 72 has been processed by the background routine 64 in order to store the subject matter of the signal in the form of the second set of data that is stored in the memory 56 of the handheld electronic device 4. Since the second set of data is resident in the memory 56 of the handheld electronic device 4, it can be readily accessed by a user. Moreover, since the second set of data is resident on the handheld electronic device 4, the handheld electronic device 4 advantageously need not be in wireless communication with the communications network 76 at the time the second set of data is accessed by the user. For instance, this would enable a user to access data even if the user is outside the range of communication of the communications network 76. Since the second set of data was stored in the memory 56 by the background routine 64, the reception of the signal and the storage of the second set of data occurs substantially in a fashion transparent to the user, meaning that the user likely was unaware that the reception of the signal and the storage of the second set of data occurred. Since the pushing of the first set of data in the form of the signal, as at 112, occurred in response to the occurrence of the predetermined event, as at 108, the transmission bandwidth and power consumption are maintained at a minimum.

Figure 4:
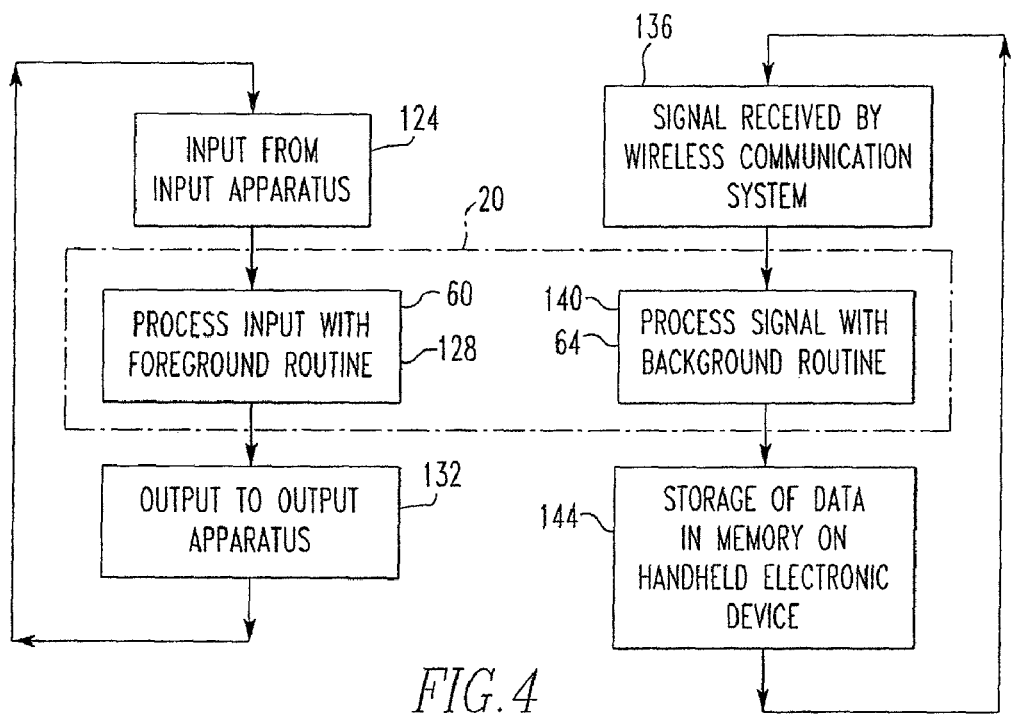
FIG. 4 is another flowchart of a portion of the improved method of the invention.

The operation of the foreground routine 60 and the background routine 64 are depicted in further schematic detail in FIG. 4. As can be seen, input is provided, as at 124, from the input apparatus 12 and is directed to the foreground routine 60 where processing occurs, as at 128. The foreground routine 60 then provides as at 132 an output to the output apparatus 16. It is understood, however, that the depicted foreground routine 60 is of an exemplary nature and need not require both inputs from the input apparatus, as at 124, and provide output to the output apparatus as at 132.

As was indicated at the numeral 116, and as is similarly indicated at the numeral 136, the signal is received by the wireless communication system 78. The content of the signal ultimately is processed by the background routine 64, as is indicated at the numeral 140. The background routine 64 stores, as at 144, and as was similarly indicated at the numeral 120, the data in the form of a second set of data stored in the memory 56 of the handheld electronic device 4.

Notably the foreground routine 60 and the background routine 64 can be operated in parallel, i.e., substantially simultaneously, on the processor apparatus 20. The operation of the foreground routine 60 is apparent to the user and the operation of the background routine 64 is generally transparent to the user, although in certain circumstances it may be desirable to provide to the user an indication that storage of the second set of data has occurred, as at 144 and 120, and the indication can be provided without departing from the concept of the invention.

As suggested above, a profile can be associated with the handheld electronic device 4 and can be made known to the server 72. Such a profile typically would be a profile of a user of the handheld electronic device 4. The profile can be a predetermined profile such as might indicate the particular set of data services that are provided as part of a data subscription to which the user may have subscribed. The profile could be customized, such as, for instance, by being tailored by the user to request that certain types of data be provided in certain types of order, for instance, or it can be customized in numerous other fashions to suit the user. The profile also can include one or more preferences of the user, such as may be derived from previous use by the user or that may be specified by the user as to the user's desires, habits, and the like.

The first set of data, as at 104, is typically determined, at least in part, by the profile of the handheld electronic device 4, which will generally will be the profile of the user of the handheld electronic device 4 and will be known to the server 72. Alternatively, or additionally, a geographic disposition of the handheld electronic device 4 can be determined in numerous fashions and can be employed in determining, at least in part, the makeup of the first data set, as at 104. By way of example a geographic disposition of the handheld electronic device 4 can be determined on the handheld electronic device 4 itself through the use of global positioning system (GPS) signals received on the handheld electronic device 4. Alternatively, or in addition thereto, the geographic disposition can be determined by the server 72 and the communications network 76 through triangulation of a signal received from a handheld electronic device 4 at various antennae of the communications network 76. The geographic disposition, i.e., location of the handheld electronic device 4 can be obtained in other fashions without departing from the concept of the invention.

Figure 5:
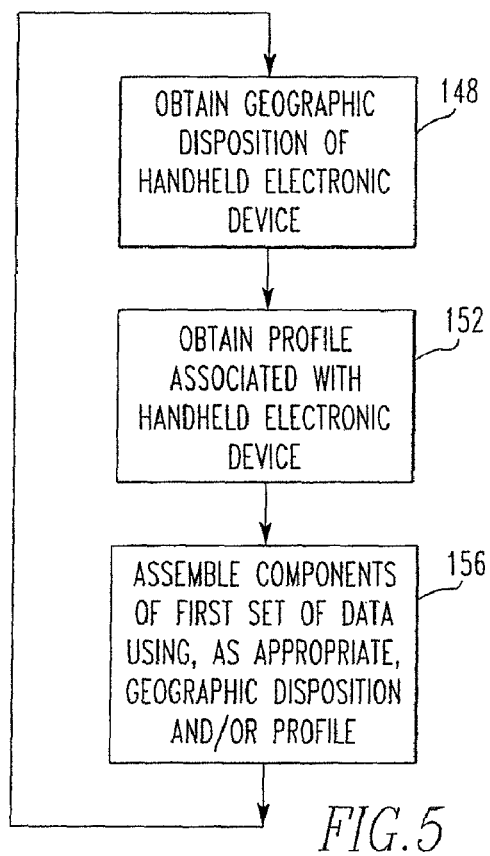
FIG. 5 is another flowchart of a portion of the improved method of the invention.

The assembling of the first set of data, as at 104, is depicted in greater detail in FIG. 5. By way of example, a geographic disposition of the handheld electronic device 4 can be obtained, as at 148, and as suggested above, by determining the geographic disposition on the server 72 or by having the geographic disposition transmitted to the server 72 from the handheld electronic device 4. The profile associated with the handheld electronic device 4 is also obtained, such as at 152. The profile can be obtained either by having it already be known to the server 72 or by providing it from the handheld electronic device 4 or from some other source. As mentioned above, the profile can be any collection of indicators or values that determine the types of information that are to be provided to a user or the layout of such information, or other parameter.

Based upon the geographic disposition and the profile, the server 72 can assemble, as at 156, the various elements that will make up the first set of data. For instance, the profile may dictate that certain data, such as weather data, restaurant location data, and news be provided on the handheld electronic device 4. The geographic disposition of the handheld electronic device 4 that was obtained at 148 would be relevant to the weather and restaurant location information. Specifically, the geographic disposition would have some relevance to weather because different areas of the world have different weather. The geographic disposition would be pertinent to the data regarding restaurant locations since a user might desire that only restaurants within a certain proximity to the geographic disposition be provided on the handheld electronic device 4. The geographic disposition likely would not have any pertinence to the news, although this might not be the case if the user customizes the profile such that local news, i.e., news local to the geographic disposition, be provided on the handheld electronic device 4.

The profile obtained at 152 likely would be pertinent to the weather, the restaurant location, and the news data that is provided to the handheld electronic device 4. Specifically, the profile likely would determine the types of data that are provided, i.e., weather data, restaurant location data, and news data. The profile might also indicate an order in which the data is to be presented, and may include preferences, for instance, as to what is desired to be presented as higher priority data, and the like. The server 72 itself may serve or have available to it vast amounts of data. The various data can be filtered such as through the use of the geographic disposition and/or the profile to assemble a set of data components that together make up the first set of data. In this regard, and depending upon the specifics of the profile and the geographic disposition, either or both of the profile and the geographic disposition may be irrelevant to certain of the data that is included in the first set of data.

Figure 6:
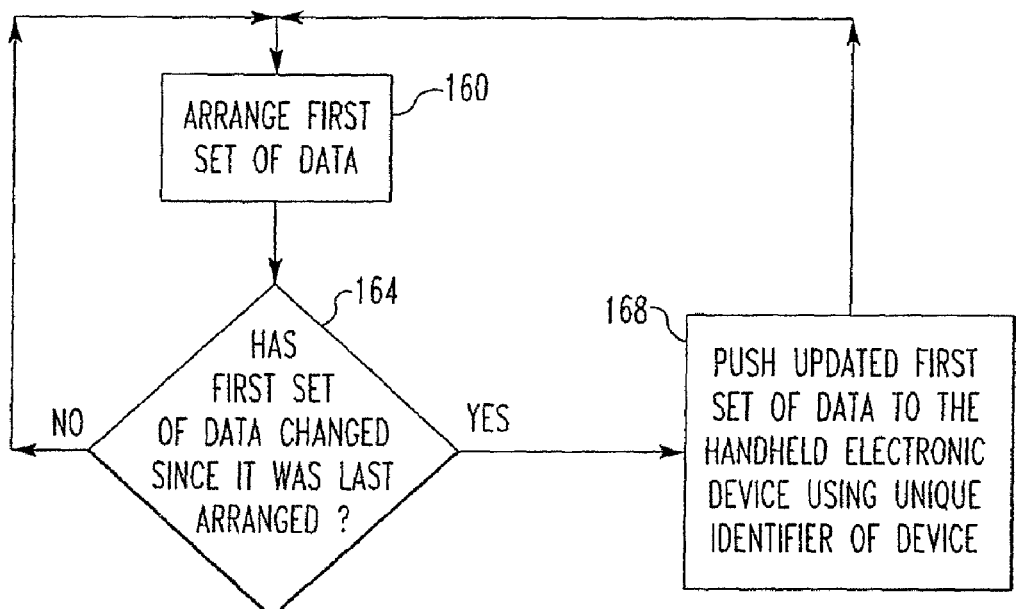
FIG. 6 is another flowchart of a portion of the improved method of the invention.

A more particular indication of what happens to the first set of data is indicated generally in FIG. 6. Once the first set of data has been completely arranged, as at 160 and as was depicted generally in FIG. 5, the system 68 makes a determination, as at 164, as to whether or not the first set of data has undergone a change since the last time the first set of data was arranged. FIG. 6 depicts the decision arrangement as being part of a continuous loop whereby the first set of data is continually being rearranged, i.e., the various aspects of the profile and the geographic disposition are used to filter the data available to the server 72 to provide a continually updated first set of data, as at 160. In certain circumstances such as might occur at nighttime, the first set of data may not change because the data and the matters affecting the data available to the server 72 are in a static condition.

However, if it is determined at 164 that the first set of data has changed, the updated first set of data is pushed, as at 168, to the handheld electronic device 4. Such an alteration of the first set of data, such as was detected at 164, could serve as the type of predetermined event, such as is determined at 108, which initiates a push of the updated first set of data, as at 168 and 112, from the server 72 to the handheld electronic device 4. In this regard, therefore, the first set of data, such as would be associated with the server 72, is intended to be always in an updated and current condition.

It is understood, however, that the updating operation can be triggered by any of a wide variety of predetermined events and can be tailored in numerous fashions. For instance, the updating operation can be triggered in the event of any change in the first set of data, or it could be triggered only after a certain degree of change in the first set of data. The updating operation can occur after the expiration of a certain period of time or in the event of any other trigger. It thus can be understood that the change in data depicted generally in FIG. 6 as driving the updating process is exemplary only, and it need not perform the updating function every time, and it may not be required for such updating to occur.

Depending upon the geographic disposition and the profile, substantial periods of time may elapse in which no change is actually made to the first set of data. However, once the first set of data changes, as may be detected at 164, the updated first set of data is pushed, as at 168 to the handheld electronic device 4. By pushing the first set of data, as at 168, only upon the occurrence of the predetermined event, such as the detection of a change in the first set of data or other predetermined event, as at 164, the transmission and reception bandwidth that are required on the handheld electronic device 4 are maintained at a minimum while still maintaining current data on the handheld electronic device 4. Similarly, the power required on the handheld electronic device 4 can be minimized by providing a transmission of the signal representative of the first set of data only when the first set of data has been changed in a predetermined fashion, or upon the occurrence of another predetermined event.

Other types of predetermined events will be apparent. For instance, a predetermined event may be determined to have occurred if the geographic disposition of the handheld electronic device 4 changes. Similarly, a predetermined event may be the expiration of a certain period of time since the immediately prior transmission of updating data from the server 72 to the handheld electronic device 4. Other types of predetermined events can be envisioned.

Further regarding a change in the first set of data, if it is desired that news be part of the first set of data, a new news story might result in a change of the first set of data, thereby triggering an updating transmission to the handheld electronic device 4. Such updating potentially could be customized by the user and stored in the profile, such as if a user desired to have information be updated only upon the occurrence of an event of national importance, rather than an event of only local or of other perceived lesser degrees importance.

As can be understood from the foregoing, therefore, the system 68 enables the handheld electronic device 4 to have stored thereon a second set of data that is reflective of the first set of data available to the server 72, with the second set of data generally always, or at least desirably, being in an updated condition. Such data is updated using a minimum of transmission/reception bandwidth and with a minimum of power because the data is updated only when necessary, such as upon the occurrence of a predetermined event.

It is understood that the handheld electronic device 4 may not always receive each signal from the server 72, such as when the handheld electronic device 4 may be out of transmission range of the communications network 76. In such a circumstance, however, the second set of data will remain stored in the memory 56 on the handheld electronic device 4 and will remain accessible even though the handheld electronic device 4 is out of radio contact with the communications network 76. In such a situation, relatively current data will still remain available to the user on the handheld electronic device 4 despite the absence of radio communication at that time.

Figure 7:
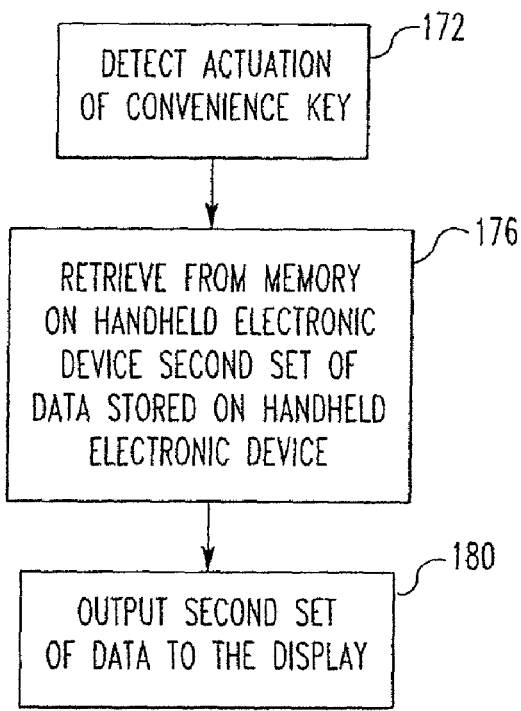
FIG. 7 is another flowchart of a portion of the improved method of the invention.

The second set of data stored in the memory 56 can be made readily available to the user through the use of the <CONVENIENCE> key 44. As is depicted in FIG. 7, an actuation of the <CONVENIENCE> key 44 can be detected, as at 172. Responsive thereto, the second set of data can be retrieved from the memory 56, as at 176, and can be output, as at 180, on the display 50.

The output provided, as at 180, can be, for example, in the form of a content page 80 as is depicted on the display 50 in FIG. 1. The content page 80 can be in the form of, for example, a home page provided by the communications network 76 and may be customizable by the user. In this regard, the invention potentially could be in the nature of a content page that is periodically pushed to the handheld electronic device 4 in certain circumstances for retrieval as needed by the user. The content page 80 may constitute the entirely of the second set of data, or the second set of data can include further data, such as if the content page 80 included one or more shortcuts 92 that cause the retrieval from the memory 56 of certain other data for output to the display 50. The content of the second set of data stored in the memory 56 can be customized by the user or otherwise determined, such as through the use of the profile.

It is noted that the periodic updates of the second set of data stored in the memory 56 can either be in the nature of data that replaces outmoded data or as data that is stored in addition to the outmoded data. Likely, an actuation of the <CONVENIENCE> key 44 will retrieve from the memory 56 the most current data, and the handheld electronic device 4 may be set up so that only the most current data is maintained or that outmoded data is retained for a certain period of time.

Figure 9:
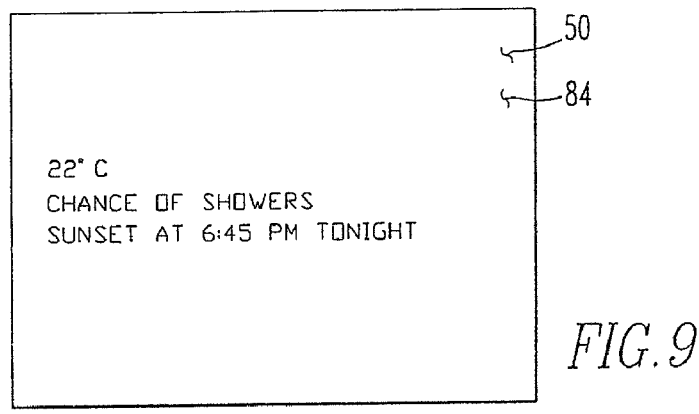
FIG. 9 is an exemplary output to the display.

Another exemplary output to the display 50 is depicted generally in FIG. 9. The display 50 in FIG. 9 is outputting to the user a content page 84 that has been customized by the user. Specifically, in the example of FIG. 9, the user has customized the content output 84 to provide the current temperature, the current weather forecast, and the time at which sunset will occur. The handheld electronic device 4 can be set up such that the aforementioned information is automatically retrieved from the memory 56 and is output to the display 50 upon the detection of an actuation of the <CONVENIENCE> key 44.

Figure 8:
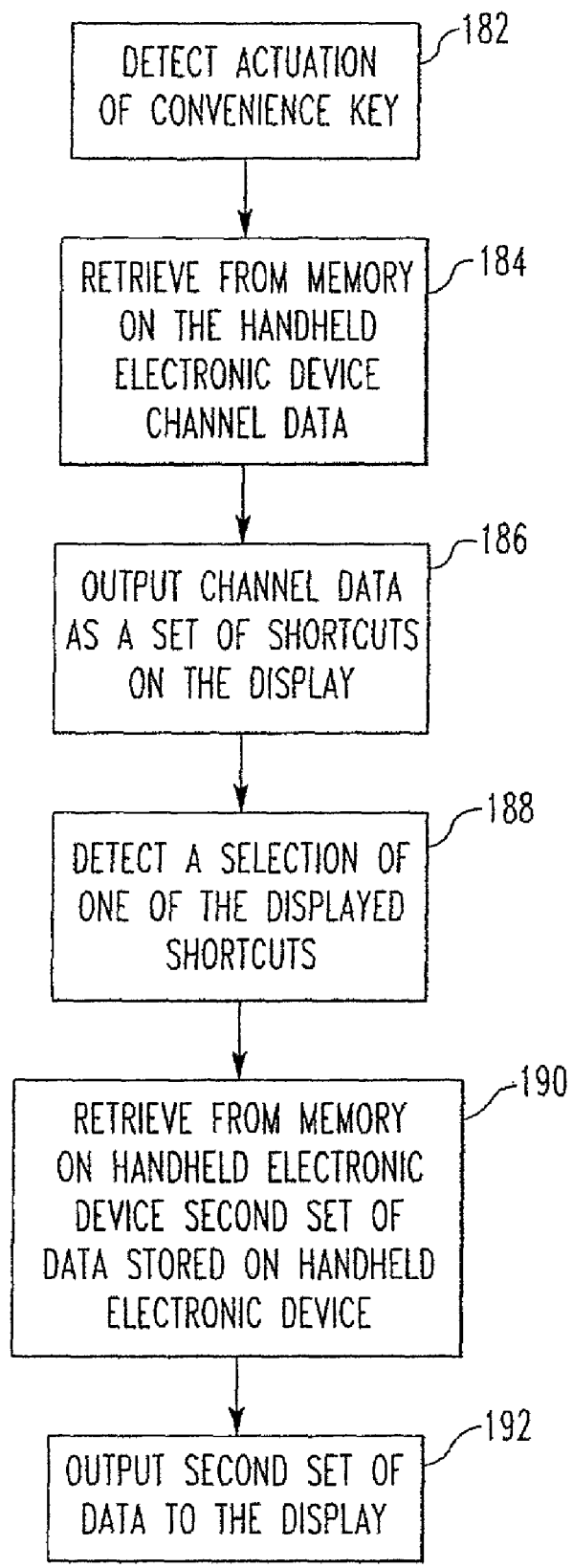
FIG. 8 is another flowchart of a portion of the improved method of the invention.

Depending upon the content and the amount of data that is desired by the user to be maintained on the handheld electronic device 4, an actuation of the <CONVENIENCE> key 44 may additionally or alternatively output a number of channels that can be selected by the user for display of specific data. For instance, and as in indicated generally in FIG. 8, upon detection of an actuation of the <CONVENIENCE> key 44, as at 182, certain channel data may be retrieved from the memory 56 and output, as at 186 to the display 50 in the form of a plurality of shortcuts 92, as is indicated generally in FIG. 11. The various shortcuts 92 depict the various types of information that are stored on the handheld electronic device 4 and that can be easily obtained.

Upon the detection, as at 188, of a selection of one of the displayed shortcuts 92, the relevant data is retrieved, as at 190, from the memory 56 and is output, as at 192, to the display 50. One of the shortcuts 92 can be selected in any of a variety of fashions that will be apparent. For instance, upon the output of the channel data, as at 186, to result in the shortcuts 92 depicted generally at FIG. 9, a selection of the shortcut 92 "RESTAURANTS" may result in a retrieval of restaurant location data stored in the memory 56 for output to the display 50, such as might result in the output depicted generally in FIG. 10. It is also understood that the output depicted in FIG. 10 could be obtained directly by an actuation of the <CONVENIENCE> key 44 if the user desired that such restaurant data be immediately displayed and set up the handheld electronic device 4 and/or the profile to provide such an output.

Figure 10:
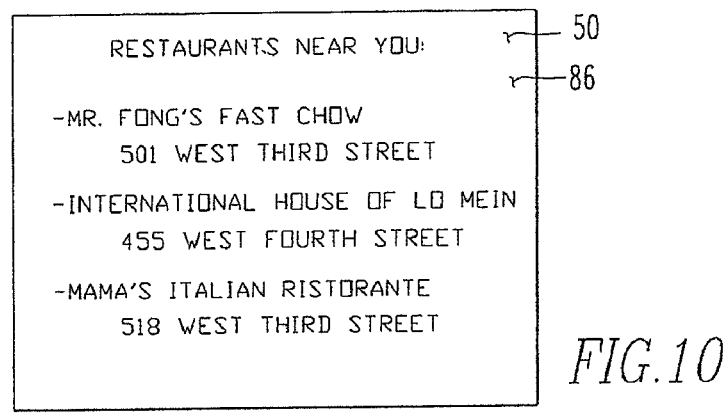
FIG. 10 is another exemplary output to the display.

As can be seen from FIG. 10, three different restaurants are displayed. For example, the user may have provided a preference for Chinese restaurants and Italian restaurants, with the Chinese restaurants being favored. Such a preference may have been expressly provided by the user or may have been derived from previous behavior or habits of the user.

By way of further example, the restaurants may be listed in order of proximity to the geographic disposition of the handheld electronic device 4. Furthermore, and as is indicated generally in FIG. 10, the listing may first provide all of the Chinese restaurants in order of their proximity, with Italian restaurants being listed in order of proximity, but after the listing of the Chinese restaurants.

The second set of data stored in the memory 56 is of a very rich content and is highly personal to the user since the data is customizable and is provided according to the user's desires, preferences and interests, and the like. The exemplary output depicted generally in FIG. 10 can be considered to be in the form of a content output 86 that is directed by one or more preferences or interests of the user.

Figure 11:
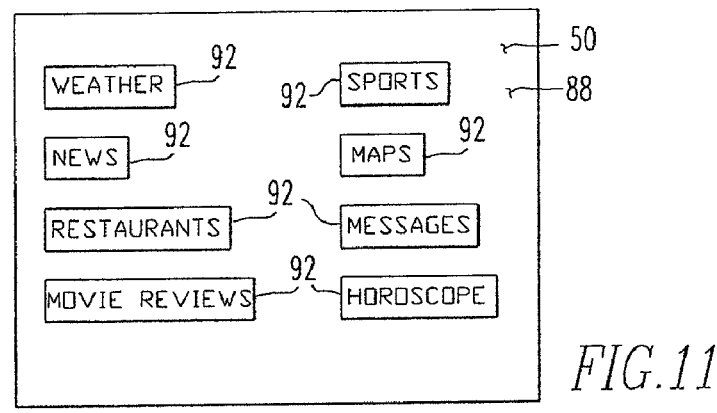
FIG. 11 is another exemplary output to the display.
Figure 12:
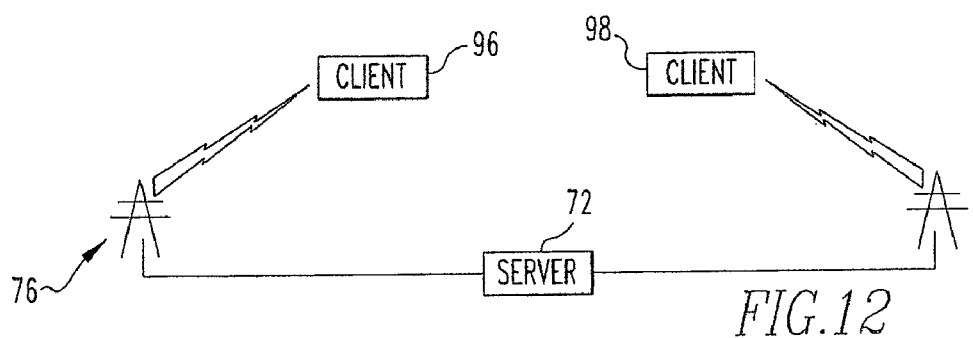
FIG. 12 is a schematic depiction of another aspect of a system in accordance with the invention.

As can be further understood, the various shortcuts 92 depicted as being displayed in FIG. 11 may reflect data that is stored on the handheld electronic device 4 for immediate retrieval by a user. The shortcuts 92 themselves are also of a very rich content and are highly personal to the user since the user likely would have determined that those channels of information, i.e., data, are desirable to the user. The highly personal and rich content of the data stored on the handheld electronic device 4 increase the versatility of the handheld electronic device 4 and increase the likelihood that a user will consult such data since the data is desired by the user and is stored directly on the handheld electronic device 4 in order to enable substantially immediate retrieval without any delays for transmission of the data from a data source.

A user's profile can be used in other fashions. For instance, the handheld electronic device 4 may be only one of many clients that are wirelessly connectable with the communications network 76 and the server 72 or set of servers. For instance, the handheld electronic device 4 may be a first client 96 with a given profile. A second client 98 may have another profile that is particular to a second user who constitutes the second client 98. The server 72 may determine that some type or similarity or other reason for association between the first client 96 and the second client 98 would be desirable. For instance, both profiles may in some circumstance be the same. Alternatively, or in addition thereto, the profiles may indicate a complementary relationship such as if the first client 96 were a seller of certain goods and the second client 98 were a purchaser of such goods.

For example, the server 72 may invite both the first client 96 and the second client 98 to communicate with one another through the server 72. Such interaction can be suggested or provided by the server 72 in numerous fashions and for various purposes according to various criteria.

The first client 96 also can be provided with a listing of a set of other users, i.e., clients that are available, for instance, within a given geographic proximity or that have a certain aspect in their user profile. The second set of data and the listing of the set of other users can be tailored to be updated, for instance, when any of the information changes, such as if any of the users moved out of the geographic proximity, and the like.

It thus can be seen that the system 68 provides data that can be stored on the handheld electronic device, with the data being current and readily accessible by a user without a delay for transmission of the data from a data source. The data can be customizable in all fashions by the user and is available even when out of radio communication with the communications network 76 since the most current data was stored in the memory 56 as of the last successful transmission of the signal between the communications network 76 and the handheld electronic device 4. The second set of data stored in the memory 56 of the handheld electronic device 4 is highly personal to the user because it is reflective of the user's needs, interests, desires and preferences, and therefore is highly useful to the user. Such usefulness to the user is greatly increased since the rich personalized data is immediately available to the user upon an actuation of the <CONVENIENCE> key 44 and possibly also with the selection of a shortcut 92.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A method comprising:
receiving a set of data at an electronic device;
storing the set of data at the electronic device;
receiving at the electronic device an altered set of data produced by altering at least a portion of the set of data, the altered set of data received in response to a predetermined event;
storing the altered set of data at the electronic device; and
employing a profile associated with the electronic device to configure at least one of the set of data and the altered set of data to comply with the profile.

2. The method of claim 1, further comprising executing a substantially transparent routine for storing at the electronic device the set of data and the altered set of data.

3. The method of claim 1, further comprising, responsive to an actuation of a predetermined input member at the electronic device, outputting at least a portion of the altered set of data.

4. The method of claim 3, further comprising replacing the set of data with the altered set of data.

5. The method of claim 1, further comprising:
responsive to an actuation of a predetermined input member at the electronic device, outputting shortcuts, at least some of the shortcuts comprising shortcut functions to corresponding portions of the altered set of data; and
responsive to a selection of a given shortcut, displaying a given corresponding portion of the altered set of data corresponding to the given shortcut.

6. The method of claim 1, further comprising receiving geographic data that at least partially corresponds with a first geographic disposition of the electronic device.

7. The method of claim 6, wherein the geographic data is specific to the first geographic disposition and is selected in accordance with the profile.

8. The method of claim 6, wherein the predetermined event comprises a determination that a second geographic disposition of the electronic device is different than the first geographic disposition.

9. The method of claim 1, wherein the predetermined event comprises the altering the at least a portion of the set of data.

10. The method of claim 9, wherein the altering is based on a change in geographic disposition of the electronic device.

11. An electronic device comprising:
an input apparatus;
an output apparatus; and
a processor enabled to:
receive a set of data;
store the set of data;
receive an altered set of data produced by altering at least a portion of the set of data, the altered set of data received in response to a predetermined event;
store the altered set of data at the electronic device; and
employ a profile associated with the electronic device to configure at least one of the set of data and the altered set of data to comply with the profile.

12. The electronic device of claim 11, the processor further configured to execute a substantially transparent routine for storing the set of data and the altered set of data.

13. The electronic device of claim 11, the processor further configured to, responsive to an actuation of a predetermined input member at the electronic device, output at least a portion of the altered set of data.

14. The electronic device of claim 13, the processor further configured to replace the set of data with the altered set of data.

15. The electronic device of claim 11, the processor further configured to:
responsive to an actuation of a predetermined input member at the electronic device, output shortcuts, at least some of the shortcuts comprising shortcut functions to corresponding portions of the altered set of data; and
responsive to a selection of a given shortcut, cause a display device to display a given corresponding portion of the altered set of data corresponding to the given shortcut.

16. The electronic device of claim 11, the processor further configured to receive geographic data that at least partially corresponds with a first geographic disposition of the electronic device.

17. The electronic device of claim 16, wherein the geographic data is specific to the first geographic disposition and is selected in accordance with the profile.

18. The electronic device of claim 16, wherein the predetermined event comprises a determination that a second geographic disposition of the electronic device is different than the first geographic disposition.

19. The electronic device of claim 11, wherein the predetermined event comprises the altering the at least a portion of the set of data.

20. The electronic device of claim 19, wherein the altering is based on a change in geographic disposition of the electronic device.

* * * * *